United States Patent
Cappello et al.

(10) Patent No.: US 11,146,907 B2
(45) Date of Patent: Oct. 12, 2021

(54) AUDIO CONTRIBUTION IDENTIFICATION SYSTEM AND METHOD

(71) Applicant: Sony Interactive Entertainment Inc., Tokyo (JP)

(72) Inventors: Fabio Cappello, London (GB); Oliver Hume, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/839,837

(22) Filed: Apr. 3, 2020

(65) Prior Publication Data

US 2020/0327871 A1 Oct. 15, 2020

(30) Foreign Application Priority Data

Apr. 10, 2019 (GB) ..................................... 1905091

(51) Int. Cl.
*H04S 7/00* (2006.01)
*H04S 3/00* (2006.01)
(Continued)

(52) U.S. Cl.
CPC ............. *H04S 7/303* (2013.01); *G06N 20/00* (2019.01); *G10H 1/0008* (2013.01);
(Continued)

(58) Field of Classification Search
CPC .......... H04S 7/303; H04S 7/304; H04S 7/306; H04S 2400/13; H04S 2400/15;
(Continued)

(56) References Cited

U.S. PATENT DOCUMENTS 9,318,106 B2 * 4/2016 Sun ........................ G10L 15/063
2010/0299144 A1 * 11/2010 Barzelay ............. G10L 21/0272
704/233

(Continued)

FOREIGN PATENT DOCUMENTS

EP 2148321 B1 3/2015

OTHER PUBLICATIONS

Combined Search and Examination report for corresponding GB Application No. GB 1905091.3, 3 pages, dated Oct. 10, 2019.

*Primary Examiner* — Jeffrey Donels
(74) *Attorney, Agent, or Firm* — Matthew B. Dernier, Esq.

(57) ABSTRACT

A system for identifying the contribution of a given sound source to a composite audio track, the system comprising an audio input unit operable to receive an input composite audio track comprising two or more sound sources, including the given sound source, an audio generation unit operable to generate, using a model of a sound source, an approximation of the contribution of the given sound source to the composite audio track, an audio comparison unit operable to compare the generated audio to at least a portion of the composite audio track to determine whether the generated audio provides an approximation of the composite audio track that meets a threshold degree of similarity, and an audio identification unit operable to identify, when the threshold is met, the generated audio as a suitable representation of the contribution of the sound source to the composite audio track.

10 Claims, 6 Drawing Sheets

(51) Int. Cl.
*G06N 20/00* (2019.01)
*G10H 1/00* (2006.01)
*G10L 15/06* (2013.01)
*G10L 15/08* (2006.01)

(52) U.S. Cl.
CPC .......... *G10L 15/063* (2013.01); *G10L 15/083* (2013.01); *H04S 3/008* (2013.01); *G10H 2210/056* (2013.01); *G10H 2210/086* (2013.01); *G10L 2015/088* (2013.01); *H04S 2400/01* (2013.01); *H04S 2400/11* (2013.01)

(58) Field of Classification Search
CPC .. H04S 3/008; H04S 2400/01; H04S 2400/11; G06N 20/00; G02B 27/017; G06F 3/011; G10H 2240/145; G10H 2210/031; G10H 1/0008; G10H 2210/056; G10H 2210/086; G10L 21/0272; G10L 15/063; G10L 15/083; G10L 2015/088; G10L 25/51; G10L 25/30; G10L 21/028
See application file for complete search history.

(56) References Cited

U.S. PATENT DOCUMENTS

| | | | |
|---|---|---|---|
| 2015/0046377 A1 | 2/2015 | Sun | |
| 2016/0071526 A1 | 3/2016 | Windgate | |
| 2016/0125893 A1* | 5/2016 | Le Magoarou | G10L 21/028 |
| | | | 704/204 |
| 2019/0206417 A1* | 7/2019 | Woodruff | G10L 21/038 |
| 2020/0169591 A1* | 5/2020 | Ingel | G10L 17/00 |
| 2020/0329331 A1* | 10/2020 | Cappello | G10L 21/028 |

* cited by examiner

AUDIO CONTRIBUTION IDENTIFICATION SYSTEM AND METHOD

BACKGROUND OF THE INVENTION

Field of the Invention

This disclosure relates to an audio separation system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In view of the increasing demand for high-quality and versatile audio, the desire for improved audio processing methods has also increased. Examples of improvements to the audio quality include the reduction of artefacts and volume levelling for an audio track, while improvements to the versatility could include changing the audio format or the file size. In some cases it is considered advantageous to be able to isolate (or at least partially isolate) sound sources from an audio track, or to remove (or at least partially remove) a sound source from an audio track. This may be referred to as 'audio separation', as it relates to the separation of an audio track such that one or more components of the audio track are not present in an output.

Audio separation processing can often be difficult in the case of complex audio, such as in the case of audio tracks that comprise a large number of audio sources. For example, it may become difficult to differentiate between different sound sources contributing to the audio track or signal—this is particularly true in the case for an audio track in which multiple similar instruments are used, or when multiple voices are present.

While it may be beneficial to be able to separate audio tracks into component parts for each group of one or more sound sources, the associated difficulties may result in a lower-quality audio experience. Previously proposed methods for audio separation often involve masking 'unwanted' (i.e. non-target) portions of the audio track, which can result in difficulties such as either too much information being removed (such that portions of the desired audio are removed) or not enough (such that portions of the audio track other than the desired audio are retained.

It is apparent that these difficulties may therefore result in improperly-separated sounds; this may be identified by audio corresponding to a first a sound source also comprising a contribution from audio corresponding to a second (or other additional) sound source. More specifically, an example of this may be the obtaining of a voice track that comprises instrument sounds due to poor separation of the voice from the music in an audio track. It is therefore apparent that the ability of humans to separate sound sources from one another (such as to listen to a specific speaker in a busy room, known as the 'cocktail party effect') is often superior to existing computer-implemented methods; the development of an improved method in order to bridge this gap in effectiveness is therefore a desirable aim.

The obtaining of separated audio may have a number of different applications. For example, by isolating the sound sources it may be easier to apply further audio processing to the audio track (such as on a per-instrument or per-sound-source basis), or in some cases it may be beneficial to associate audio with a particular source (for example, in assisting users with learning to play their target instrument by isolating that instrument from a track or by identifying which element in video content corresponds to a particular part of the audio track).

It is in the context of the above problems that the present invention arises.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1A:
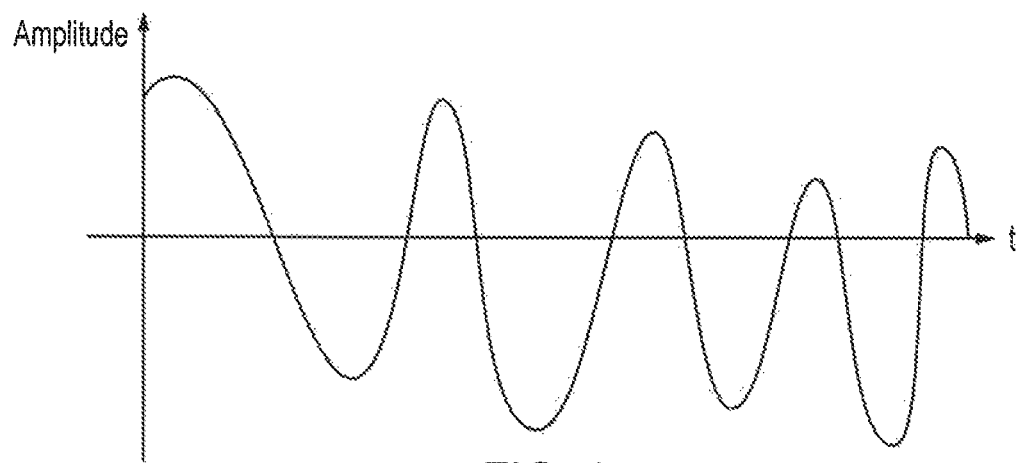
FIGS. 1a, 1b, and 1c schematically illustrate simplified output sound waves.

Referring now to the drawings, wherein like reference numerals designate identical or corresponding parts throughout the several views, embodiments of the present disclosure are discussed. Firstly, an example of a method in which a simplified audio signal is to be separated is considered.

Figure 1B:
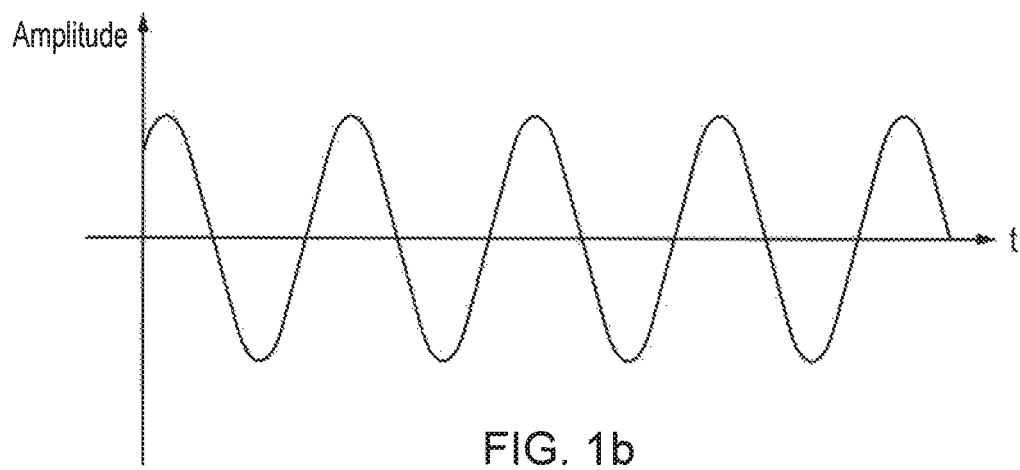
Figure 1C:
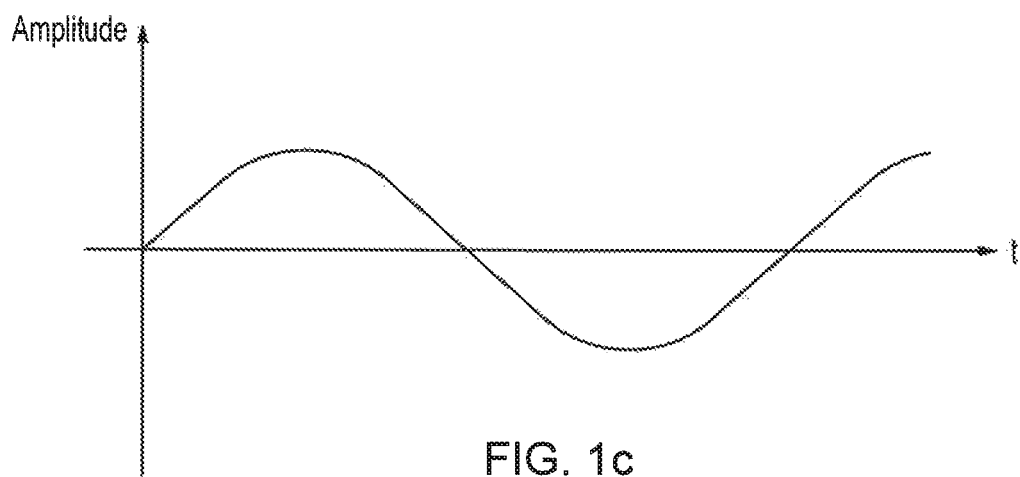

FIG. 1a schematically illustrates a composite audio signal, with amplitude of an audio output on the vertical axis and time on the horizontal. As can be seen, the amplitude of the signal varies over time in a generally sinusoidal manner. However, the signal is such that the magnitudes of each of the peaks and troughs are not constant over time. In this simplified example, the composite wave of FIG. 1a is a function of two separate component waves—these are schematically illustrated in FIGS. 1b and 1c. The varying amplitudes is apparent in FIG. 1a; for example, on the right side of the graph the troughs are greater in magnitude than the peaks in line with the oscillation shown in FIG. 1c.

While the separation of the composite wave of FIG. 1a into the component waves of FIGS. 1b and 1c appears rather simple in this example, in practice a separation is much more complicated. For example, the number of sound sources is likely to be greater than two, and each of the sound sources may have a complex frequency profile that will vary how the sounds are interpreted. In addition to this, environmental factors such as the location of sound sources in an environment or the acoustics of the recording environment may also impact this. For example, the loudness or perceptibility of one or more sounds may vary between different recording environments. In view of these complications, it is immediately apparent as to how errors and inaccuracies may be present when masking audio tracks to isolate sound sources.

For instance, there are several types of masking that can interfere with the sound separation process. A first example is that of simultaneous masking, which is when sounds overlap (that is, are received at the same time) such that one sound prevents another from being heard. This effect may further be dependent upon the relative frequencies or intensities of the audio signals. A second example is that of temporal masking, which is when sounds that immediately precede/succeed one another may cause one or more of the preceding/succeeding sounds from being audible.

Figure 2:
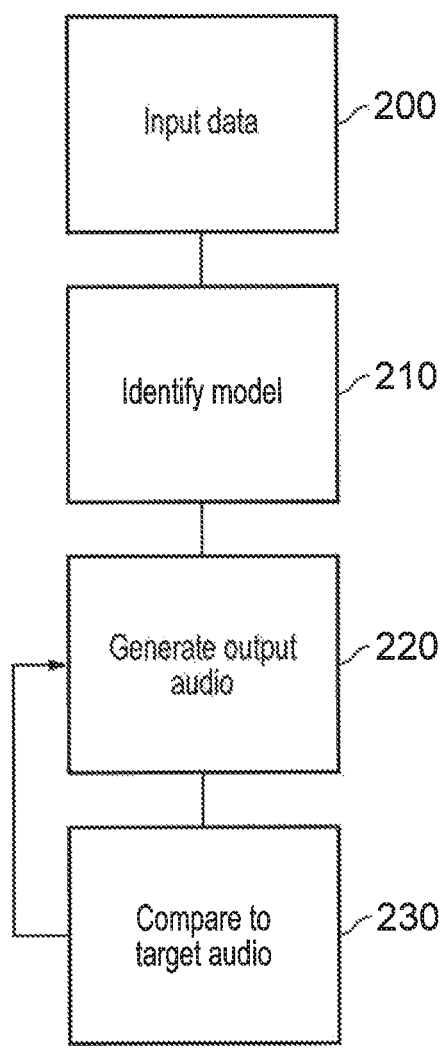
FIG. 2 schematically illustrates an audio separation/generation method.

In the present application, an alternative approach is taken in which instead of masking the existing audio track, steps are taken to generate new audio that corresponds to a desired subset of one or more of the sound sources present in the audio. That is, rather than masking all sound not corresponding to a given sound source within an audio track, a new audio track may be generated that comprises only audio corresponding to that sound source. FIG. 2 schematically illustrates such a method.

At a step 200, input data is provided. This data includes an audio track for which the audio separation/generation method is to be performed, in addition to further information such as the target element of the audio track (for example, an instrument or other sound source which is to be separated from the rest of the sound within the audio track).

At a step 210, a model to be used for the generation of audio is to be identified. This step may comprise the generation of a model, in some embodiments, and/or the provision or selection of parameters used to constrain the (or an existing) model. The model may be used to simulate the output of audio from a specific sound source, such as a particular instrument or person's voice. A more detailed discussion of sound generation models is provided below.

At a step 220, output audio is generated using the selected model or models. The generated audio should be an approximation of the contribution of the modelled sound source to the initial audio track—for example, a guitar track may be generated to approximate the guitar portion of the initial audio track.

The generated output may be in any suitable format; it is not limited to the generation of a raw audio signal in the time domain. For example the audio may be generated symbolically, such as in the form of sheet music or MIDI representations that describe audio. Audio may also be generated in the frequency domain, resulting in the output of a spectrogram from which a sound may be recovered (for example, by using a minimum phase reconstruction of the signal).

Some sound sources may be more easily replicable using specific generation methods and formats—as such, models may select the format as appropriate. For example, when generating output audio corresponding to a speech input it may be more appropriate to use a symbolic representation as the identification of words may be simpler in such a format (although of course, any suitable format may be useful).

At a step 230 the generated audio is compared to the target audio, the target audio being the corresponding portion of the initial audio track. If the comparison determines that the generated audio is not a suitable approximation of the target audio, then the processing returns to step 220 which is operable to generate a new approximation with updated model parameters (such as parameters that vary in dependence upon feedback about the differences between the generated and target audio). However, if it is determined that the generated audio is a suitable approximation of the target audio then the generated audio is output for use.

The model of the sound source that is used should comprise information that characterises that sound source. For example, when modelling a piano as the sound source information such as the sound generated when pressing each key should be included, as well as other constraints upon the sound output such as the number of keys that can be pressed simultaneously (and the spread of keys that can be pressed simultaneously/within a threshold amount of time due to user hand size/movement speed).

Of course, there may be a number of variables that need to be taken into account when utilising such a model. For instance, if two people together play a single piano then this makes a substantial difference to the constraints upon the notes that are able to be played simultaneously or in quick succession. Further modifications to increase the specificity of the model, such as those relating to a particular instrument or musician, may also be considered in order to improve the ability of the model to approximate the desired audio.

For example, modifications may include the provision of details such as information about the instrument itself (make and model, or physical characteristics, for example), how it is tuned, and/or information about the output method associated with the instrument (such as through a particular amplifier that may cause the sound to be modified in a particular manner).

Similarly, patterns in the generated audio may also be identified to assist with generating a suitable representation of the contribution of that instrument. For example, it may be identified that an instrument plays the same set of notes repeatedly and this information can be used to assist the audio generation process in parts in which the contribution of the sound source may be difficult to identify (such as in particularly loud/chaotic portions of an audio track). Similarly, this may apply if the model is able to identify the chorus of a song as this may be repetitive.

While the use of pattern identification is considered to be able to improve the accuracy of the audio generation process, this may also assist in improving the efficiency as similar portions may be simply copied from parts of the track generated at an earlier time. The amount of processing required may therefore be significantly reduced, particular in audio tracks that are considered to have a high degree of repetition.

Of course, while the discussion has been largely with respect to instruments, other sound sources may also be considered. For example, speech, animal noises, sounds of machinery or equipment (such as input devices for an entertainment device) being operated, and/or sounds output by a game or other media may also be considered to be suitable sound sources for modelling in this manner.

While a single model may be provided that is operable to identify and generate audio corresponding to any of a plurality of sound sources, in practice a plurality of models may be preferable. Models may be generated with any suitable degree of granularity; it is considered that there may be a trade-off between the quality of the audio generated by the model (or the time taken to generate the correct audio) and the range of applicability of the model.

To provide an example, a model may be provided that corresponds to all guitars; such a model should be able to identify and generate a range of different audio characteristics due to the range of guitars that exist and the difference in sounds generated by each. Alternatively, a model may be provided that corresponds to a subset of guitars; for example, acoustic or electric. This subset may be selected freely—for example, brand of the guitar, groups of similar guitars, or even individual guitars. In some cases, models could be provided that correspond to each of the strings of a guitar, a group of which could be used to represent the guitar as a whole.

In some cases, a composite model may be used wherein the model is generated in dependence upon user input (or other information, such as identification from the audio) so as to take into account a range of factors about the sound source. For instance, a custom guitar may not correspond to any of the particular models that already exist—in response to this, a custom model may be generated (using those existing models, where appropriate) in dependence upon information from a user about the specific components or similarities to components with existing corresponding models.

Once one or more models are defined that are each able to identify which sounds in an audio track may correspond to a respective desired sound source, and to be able to generate audio so as to correspond to those sounds, inputs to the model are provided in accordance with step 200 of FIG. 2.

A first input to the model may be that of the audio track which is to have one or more sound sources separated from the remaining audio. This may be an existing recording, such as a stored audio file, or may comprise live audio obtained using a microphone, for example.

Additional inputs may include information identifying the target sound source, information identifying where in the input audio track the target sound source is isolated (such as during a solo part of a song), information characterising the input audio (such as a music genre) and/or information about the recording conditions. As a possible alternative to the former, analysis could be performed to identify sound sources in the input audio track and the user may be able to select the target source from a list of identified sources.

In some embodiments, such as those in which 3D/multi-channel audio is provided, information about the location of sound sources in the recording environment may be used to assist in distinguishing sound sources from one another. This may be particularly useful when multiple sound sources of the same type are present in the environment, such as in a song with multiple guitarists or in a recording with multiple people having similar voices.

In some embodiments, the sound source model may be implemented using machine learning methods. Such methods may be particularly well-suited to this audio separation/generation method.

While any suitable method may be used, examples of machine learning based methods are provided below.

In some embodiments, discriminative algorithms may be used to compare generated audio output with the input audio track to determine whether or not the generated audio 'belongs' to the input audio track. In other words, the algorithm may compare the generated audio to the input audio to determine whether or not it can be seen to match the corresponding portion of the input audio track. In this case, the generated audio may be assigned a confidence value that is indicative of the likelihood that the audio matches the input; a threshold may be applied to confidence values to determine whether the generated audio is sufficiently close to the input audio.

While discriminative algorithms may be suitable in some embodiments, in other embodiments a generative learned model (such as a generative adversarial network, GAN) may be used. A GAN may be suitable for such methods as these are processes developed with the aim of generating data that matches a particular target; in the present case, this would equate to generating audio that matches a component (source) of the input audio track. A number of alternative methods of utilising a GAN may be employed, two of which are described below.

A first method of utilising a GAN is that of using it to train a conditional generative model. A conditional generative model is a model in which conditions may be applied, such as parameters relating to the desired outputs. In the present case, the conditions are specified by the input audio track—this comprises the information which is to be obtained, and as such the audio track includes information that can be used to guide the generation of the new audio using the model.

A second method of utilising a GAN is effectively that of 'reverse engineering' the sound output from the desired sound source. Typically, a generative model is provided with an input variable (this is a random vector during training) from which an output is generated. Of course, when a random input vector is provided, a random (yet dependent upon the input vector) output is generated.

However, in an implementation of the second method a more convergent approach may be taken. The input vector can be refined through backpropagation so that is produces an output that is increasingly similar to the corresponding audio in the audio track for which the separation is to be performed. This refinement may be defined with a loss function as the objective, as defined between the original audio track and the successive outputs of the GAN, wherein the input vector is modified iteratively so as to reduce the value of the loss function (indicating a higher degree of similarity between the output and the input audio track that is to be separated.

As the model is constrained such that it only operates for a subset of the sounds, such as a specific instrument, the output necessarily corresponds to that subset of sounds. The generated audio can therefore be considered to be an equivalent to the contribution of a sound source corresponding to the model, and as such the generated audio may be used as a track as if it had been separated from the original audio track.

In the case that multiple sound sources are desired to be separated from an input audio track, the separation method may be performed simultaneously or in any suitable order. In some examples, the order of separation may be in the order of model accuracy or efficiency—the results of one model may be used to assist a model used later to extract information about the desired sound source.

For example, once a guitar sound has been separated from the audio track, information about the separated sound may be used for the voice separation (for example, by performing a filtering to remove the guitar sound from the input audio to assist in identifying the voice component). In some embodiments this filtering may be used only in non-voice segments, so as to reduce the overall amount of information that is considered whilst maintaining a suitable level of audio quality in the initial input audio for the desired sound source.

Of course, these are only exemplary implementations; other approaches, using machine learning or otherwise, may be utilised within the framework of the present disclosure.

As an exemplary sound separation method in line with the method schematically illustrated in FIG. 2, we consider the example of the separation of a guitar track from a song comprising a number of other instruments and/or voices.

As in the step 200, the song is provided as the input data. Additionally, information may be input by the user to identify the guitar as the target sound source to be separated, however it may instead be the case that the method is performed for each sound source identified from analysis of the song.

In the next step (210), the model corresponding to the guitar used in the track is identified. This may be an automatic identification of the guitar based upon an analysis of the input song or metadata associated with the song, or may be selected by a user. As noted above, this model may be general (guitar), or more specific (specific model and/or play style), and can include factors such as the genre of music in determining the correct model.

At the step 220, the model is used to generate guitar tracks that approximate the guitar present in the input song.

In the first method described above, this comprises the specifying of the conditions that constrain the target audio—for example, the user (or an analysis of the input song) may be able to identify parts of the input song that correspond to target audio in order to guide the model in generating the desired audio.

In the second method described above, this instead comprises the determining of a correct input vector to the model; 'correct' here indicating that the input vector is used to generate a guitar track that matches (or at least clearly approximates) the corresponding guitar contribution in the input song.

At the step 230, the generated guitar track is compared to the input song; of course, this may be combined with the step 220 in some cases rather than being an entirely distinct step. Any suitable pattern-matching technique (for example) may be used. If the generated guitar track is found to match (or approximate to within a threshold variance) the guitar contribution in the input song then the generated guitar track is output as separated audio. If this is not the case, then the process returns to step 220 to generate a new guitar track that may be more suitable as a part of an iterative process.

Figure 3:
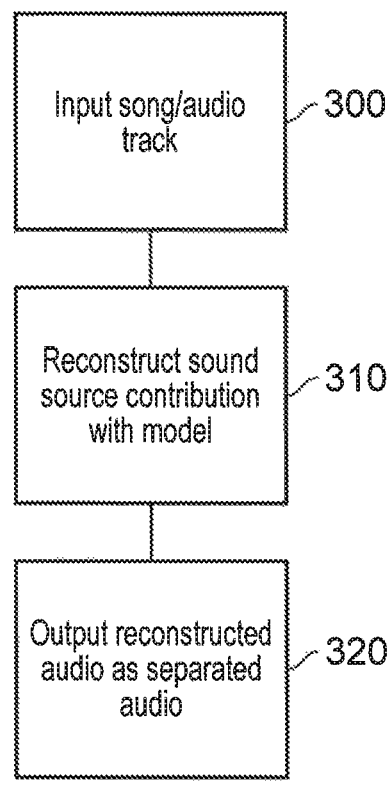
FIG. 3 schematically illustrates a further audio separation/generation method.

This may be summarised in the method shown in FIG. 3, comprising three more broadly characterised steps.

In a step 300, a song or other audio track is input.

In a step 310, sound source audio, for one or more desired sound sources, is reconstructed using a corresponding model of the sound source.

In a step 320, the reconstructed sound source audio is output as separated audio for use on a per-sound source basis (unless it is desired that audio corresponding to a plurality of sound sources are output in a single audio track).

Of course, separation of individual instrument audio tracks from input audio is not considered to be the only application of the present disclosure. In some embodiments, the objective may be to separate the speech from an individual speaker (or a group, for example in a chorus) in order to perform speech recognition, voice filtering in a noisy environment, or any other processing that may be enhanced by having a separated audio track comprising only that source of speech.

In such a case the input audio would be an audio track that contains the speech that is to be separated. This may be a spoken command to an electronic device, such as a computer-based or robotic personal assistant, or any other audio recording of speech, for example.

Constraining the model used to generate the speech may be more complex than in the case of an instrument, as the range of sounds that may be generated by a human voice can be rather high as well as having fewer physical and/or logical constraints. That is, humans are capable of generating a large number of sounds (greater than the number of notes on an instrument—for example, instruments may have constraints upon combinations of notes and logical sequencing of notes, with these constraints not being so restrictive when in the context of language.

Inputs to generate and/or select a suitable speech model may therefore include speech samples for a particular user or class of user, language-specific information (such as identifying basic sounds, syllables, and/or words), vocal range, information about accents, and/or any other information that may be used to distinguish between different sounds and/or speakers.

As noted above, there are a number of applications for the use of the separated audio content that is obtained using the described method.

A first example is that of identifying voice commands, particularly when the voice command is issued in a noisy environment. By reconstructing the audio corresponding to the input sound, it may be possible to generate an audio track comprising only the voice commands provided by a single user. This may enable a speech recognition process to more clearly identify commands, as interfering sounds (such as background noise and/or simultaneous speech from other people) may be removed (or at least substantially reduced) from the audio.

Another example is that of improved audio mixing, such as when adjusting the contribution of different instruments in a song before finalising the track. By generating the separated audio for each instrument, rather than handling the audio corresponding to all instruments simultaneously, more tailored modifications may be made to each of the different elements (that is, sound sources) of the track. This may lead to a higher-quality sound output in the finalised track, as the need to balance modifications to the audio in view of different instruments is mitigated.

A further example is that of providing an augmented reality experience in which particular sounds can be filtered out so that they are not heard by a user. For instance, this could include filtering out the sounds of nearby traffic, or of machinery in a workshop, enabling the user to hear other sounds more clearly. In a first implementation, this could be achieved by generating audio comprising the unwanted audio and subtracting this from the sound that is actually recorded. Alternatively, a second implementation could rely upon generating separated audio for each of the other sound sources that are recorded and to pass only that audio to the user.

In some cases, the disclosed method may be suitable for generating improved virtual reality content from pre-existing media. In some cases, the improved virtual media may offer an immersive experience to a user by allowing the viewpoint to be moved freely; embodiments of the present disclosure may assist in generating audio that allows such an experience to be enjoyed fully by a user whilst improving the sense of immersion. An example of this is discussed below with reference to FIGS. 4-6.

Figure 4:
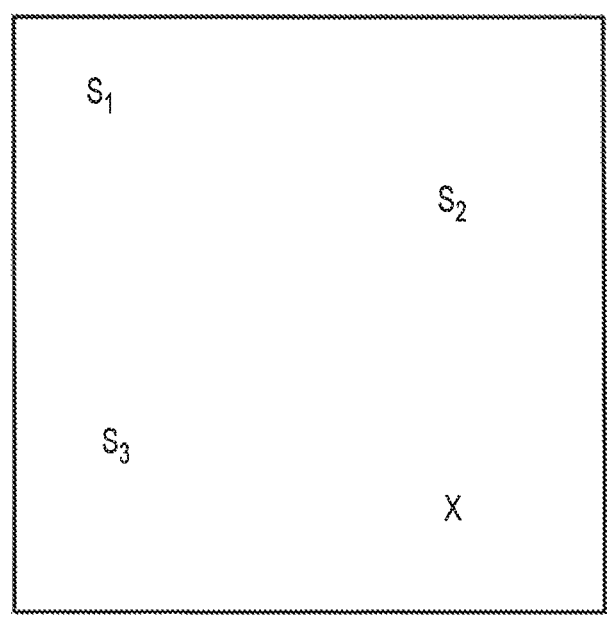
FIG. 4 schematically illustrates sound sources in a virtual environment.

FIG. 4 schematically illustrates a schematic plan view of an environment 400 in which a number of sound sources $S_1$, $S_2$, and $S_3$ are present. The environment 400 can be considered to be a virtual environment that corresponds to a real environment in which sound is captured at a microphone position X (or a virtual environment in which a virtual microphone is used as part of the sound generation process). The sound sources $S_1$, $S_2$ and $S_3$ may be any type of sound source, such as instruments, people, and/or speakers.

Figure 5:
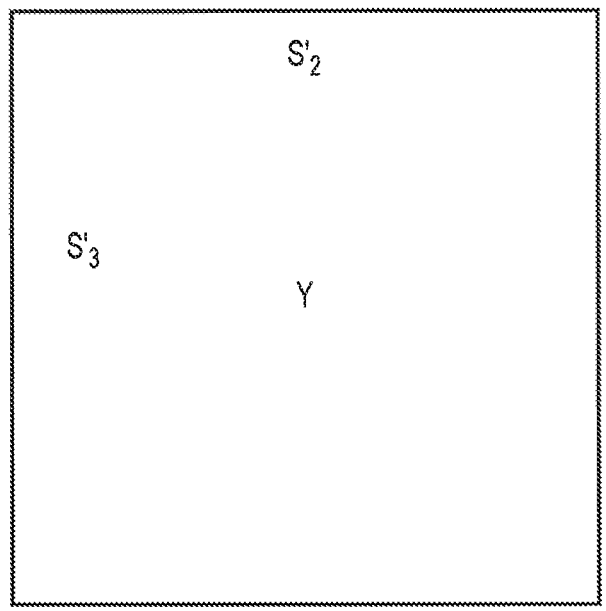
FIG. 5 schematically illustrates unmodified sound sources and a listener in a virtual environment.

FIG. 5 schematically illustrates the virtual environment 400 in which a listener Y is present. The sound sources $S_2'$ and $S_3'$ represent the perceived locations of the sound sources when the audio is presented to the listener; these differ from the positions shown for $S_2$ and $S_3$ in FIG. 4, and no sound source corresponding to $S_1$ is present in FIG. 5, due to the fact that the same audio is provided to the listener Y as was recorded at the position X. This means that the sound sources are perceived at being at the same relative positions to the listener Y as they were to the microphone X during recording (or sound generation, more generally).

This can cause a disconnect between video and audio for a user, in that the positions of elements in the video may be adjusted in view of the listener's movement within the virtual environment. This disconnect may lead to a loss of immersion, and therefore a worsening of the user experience.

Figure 6:
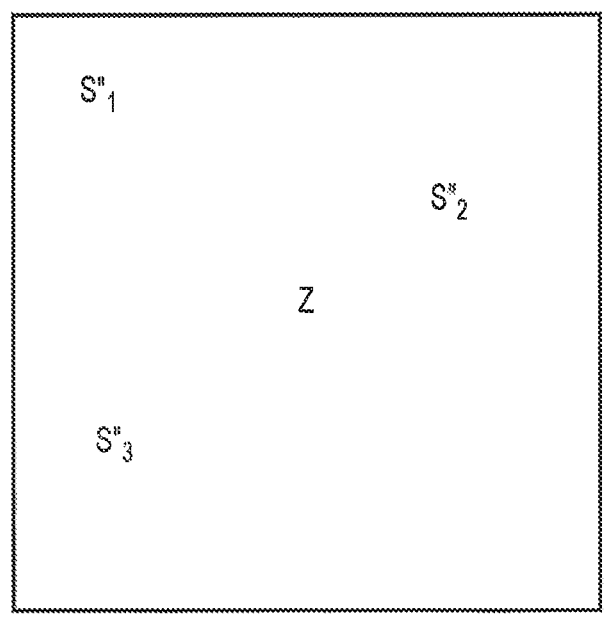
FIG. 6 schematically illustrates modified sound sources and a listener in a virtual environment.

Instead, as shown in FIG. 6, the sound sources $S_1''$, $S_2''$, and $S_3''$ should appear to be at the positions occupied by the sound sources $S_1$, $S_2$, and $S_3$ in FIG. 4. As is apparent from FIG. 6, the positions of these sound sources relative to the listener Z are different to those positions relative to the microphone as shown in FIG. 4.

Figure 7:
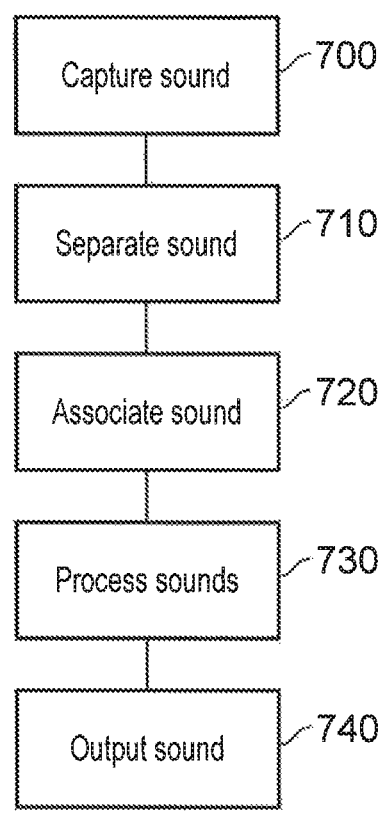
FIG. 7 schematically illustrates an audio generation method.

These varying of position may be achieved using a method according to FIG. 7, for example.

A step 700 comprises capturing or otherwise receiving a sound input. For example, this may be audio recorded (or input live) using a microphone, or an existing song or the like. In the example of FIG. 4, this step would comprise the capturing of audio from sound sources $S_1$, $S_2$, and $S_3$ with the microphone at X.

A step 710 comprises separating sound sources from the audio using a method such as those described above. The result of this process is a plurality of audio tracks (separated sounds) each corresponding to one or more sound sources in the captured audio.

A step 720 comprises associating one or more of the separated sounds with representations of corresponding sound sources in a virtual environment, and determining the location of that representation in the environment. For example, separated sounds relating to the voice of a speaker may be associated with a virtual model or image of that speaker (or any other avatar/representation), and the location of that model in the virtual environment is determined.

A step 730 comprises applying processing to one or more of the separated sounds in order to account for the position of the sound source relative to the listener in the environment. For instance, if the listener is closer to a sound source than the sound source was to the microphone in the original recording, the volume may be increased in this step. Similarly, any suitable processing may be applied to account for the change in position; in some embodiments, the sounds are modified in accordance with a head-related transfer function associated with the user for that environment. Of course, in other cases a more simplified processing may be applied to approximate the effects of a changed relative position—in such cases the processing may comprise only modifying the volume and/or apparent direction, for example.

A step 740 comprises the output of the processed separated sound to a listener. This may be performed in conjunction with displayed imagery (such as in a virtual reality experience), or may be entirely independent of displayed content—for example, an audio-only experience may be provided to a user (such as being a part of an augmented reality experience with no display component).

In accordance with this, it becomes possible to generate audio that is able to be suitably localised within a virtual environment so as to enable a user to be provided with an immersive VR experience with correct audio as the position of the user changes within the environment.

Figure 8:
FIG. 8 schematically illustrates a system for generating and outputting audio.

FIG. 8 schematically illustrates a system for generating and outputting audio, comprising an audio separation unit 800, an audio processing unit 810, and an audio output unit 820.

The audio separation unit 800 is operable to receive input audio (comprising a composite audio track), identify the contribution of a sound source to the audio track, and generate sound corresponding to that contribution.

The audio processing unit 810 is operable to perform any desirable processing to the generated audio. For example, this may comprise processing to modify the generated audio (such as audio mixing) or processing to generate audio suitable for output (such as correctly-located sound sources). Of course, in some cases this processing may be omitted and the separated audio is output directly as generated.

The audio output unit 820 is operable to output the generated/processed audio as desired.

Figure 9:
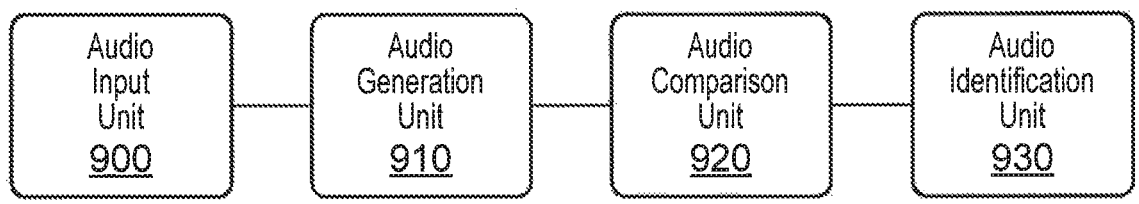
FIG. 9 schematically illustrates an audio separation unit.

FIG. 9 schematically illustrates an audio separation unit 800, as shown in FIG. 8. The audio separation unit 800 comprises an audio input unit 900, an audio generation unit 910, and an audio comparison unit 920. In some embodiments, the audio separation unit 800 may also comprise a sound source identification unit, a speech recognition unit, and/or an audio subtraction unit. These may be formed as separate units, or formed as a part of the audio input generation unit 900 or audio generation unit 910 as appropriate.

The audio input unit 900 is operable to receive an input composite audio track comprising two or more sound sources. As noted above, the input composite audio track may comprise live audio obtained using a microphone or pre-recorded audio, as appropriate for the application. The sound source may be an instrument or a person speaking, for example.

The audio generation unit 910 is operable to generate, using a model of a sound source, an approximation of the contribution of the sound source to the composite audio track. In some embodiments, the model comprises a machine learning algorithm as is described above.

If the sound source is an instrument, the model may comprise information about the sounds that are able to be generated by the instrument. Alternatively, if the sound source is a person speaking the model may comprise information about the range of sounds able to be made by the person. In some embodiments, the audio generation unit 910 is operable to use information about the recording environment in which the composite audio track is recorded as an input to the model.

The audio comparison unit 920 is operable to compare the generated audio to at least a portion of the composite audio track to determine whether the generated audio provides an approximation of the composite audio track that meets a threshold degree of similarity.

The audio identification unit 930 is operable to identify, when the threshold is met, the generated audio as a suitable representation of the contribution of the sound source to the composite audio track.

If present, the sound source identification unit is operable to identify one or more sound sources in the composite audio track. This can be used to select an appropriate model for the application, for example.

If present, the speech recognition unit is operable to identify words or commands in the person's speech. These may be used as voice commands for controlling processing of another application, for example, or for enhanced voice recording.

If present, the audio subtraction unit is operable to subtract the audio in the suitable representation from the composite audio track to generate a reduced audio track. This may be advantageous in that the audio generation unit 910 and audio comparison unit 920 may each be operable to use the reduced audio track and/or the generated suitable representation as an input to additional processing. This may reduce the total amount of audio within the track, enabling an improved comparison or generation process (for example, as the target may be more isolated).

The audio separation unit 800 is an example of a processor that is operable to identify the contribution of a sound source to a composite audio track, and in particular is operable to:

receive an input composite audio track comprising two or more sound sources;

generate, using a model of a sound source, an approximation of the contribution of the sound source to the composite audio track;

compare the generated audio to at least a portion of the composite audio track to determine whether the generated audio provides an approximation of the composite audio track that meets a threshold degree of similarity; and identify, when the threshold is met, the generated audio as a suitable representation of the contribution of the sound source to the composite audio track.

Figure 10:
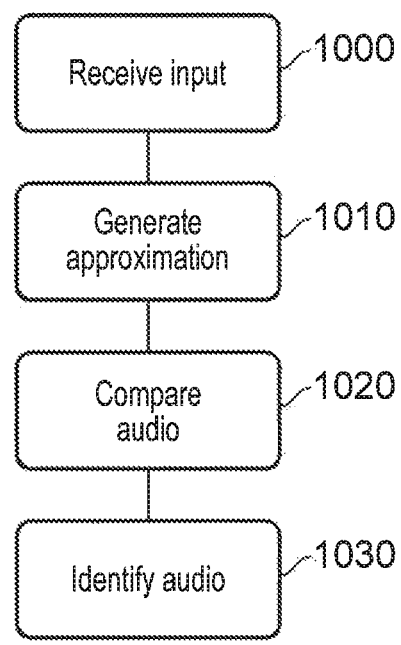
FIG. 10 schematically illustrates an audio separation method.

FIG. 10 schematically illustrates a method for identifying the contribution of a sound source to a composite audio track.

A step 1000 comprises receiving an input composite audio track comprising two or more sound sources.

A step 1010 comprises generating, using a model of a sound source, an approximation of the contribution of the sound source to the composite audio track.

A step 1020 comprises comparing the generated audio to at least a portion of the composite audio track to determine whether the generated audio provides an approximation of the composite audio track that meets a threshold degree of similarity.

A step 1030 comprises identifying, when the threshold is met, the generated audio as a suitable representation of the contribution of the sound source to the composite audio track.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for identifying the contribution of a given sound source to a composite audio track, the system comprising:
    an audio input unit operable to receive an input composite audio track comprising two or more sound sources, including the given sound source;
    an audio generation unit operable to generate, using a model of a sound source, an approximation of the contribution of the given sound source to the composite audio track;
    an audio comparison unit operable to compare the generated audio to at least a portion of the composite audio track to determine whether the generated audio provides an approximation of the composite audio track that meets a threshold degree of similarity; and
    an audio identification unit operable to identify, when the threshold is met, the generated audio as a suitable representation of the contribution of the sound source to the composite audio track, wherein at least one of:
    (i) the given sound source includes an instrument and the model comprises information about the sounds that are able to be generated by the instrument; and
    (ii) the given sound source includes a person speaking and the system further comprises a speech recognition unit operable to identify words or commands in the person's speech.

2. The system of claim 1, wherein the model comprises a machine learning algorithm.

3. The system of claim 1, comprising a sound source identification unit operable to identify one or more sound sources in the composite audio track.

4. The system of claim 1, wherein the audio generation unit is operable to generate an approximation for each of the sound sources in the composite audio track.

5. The system of claim 1, comprising an audio subtraction unit operable to subtract the audio in the suitable representation from the composite audio track to generate a reduced audio track.

6. The system of claim 5, wherein the audio generation unit and audio comparison unit are each operable to use the reduced audio track and/or the generated suitable representation as an input to additional processing.

7. The system of claim 1, wherein the audio generation unit is operable to use information about the recording environment in which the composite audio track is recorded as an input to the model.

8. The system of claim 1, wherein the input composite audio track comprises live audio obtained using a microphone.

9. A method for identifying the contribution of a given sound source to a composite audio track, the method comprising:
    receiving an input composite audio track comprising two or more sound sources, including the given sound source;

generating, using a model of a sound source, an approximation of the contribution of the given sound source to the composite audio track;

comparing the generated audio to at least a portion of the composite audio track to determine whether the generated audio provides an approximation of the composite audio track that meets a threshold degree of similarity; and identifying, when the threshold is met, the generated audio as a suitable representation of the contribution of the sound source to the composite audio track, wherein at least one of:

(i) the given sound source includes an instrument and the model comprises information about the sounds that are able to be generated by the instrument; and (ii) the given sound source includes a person speaking and the method further comprises a identifying words or commands in the person's speech.

10. A non-transitory machine-readable storage medium which stores computer software which, when executed by a computer, causes the computer to perform a method for identifying the contribution of a given sound source to a composite audio track, the method comprising:

receiving an input composite audio track comprising two or more sound sources, including the given sound source;

generating, using a model of a sound source, an approximation of the contribution of the given sound source to the composite audio track;

comparing the generated audio to at least a portion of the composite audio track to determine whether the generated audio provides an approximation of the composite audio track that meets a threshold degree of similarity; and identifying, when the threshold is met, the generated audio as a suitable representation of the contribution of the sound source to the composite audio track, wherein at least one of:

(i) the given sound source includes an instrument and the model comprises information about the sounds that are able to be generated by the instrument; and (ii) the given sound source includes a person speaking and the method further comprises a identifying words or commands in the person's speech.

\* \* \* \* \*